United States Patent [19]
Guard et al.

[11] 3,815,182
[45] June 11, 1974

[54] KNOCK DOWN LUGGAGE HAND-MANIPULATED FASTENER UTILIZING LOCK BUTTON

[75] Inventors: Edward J. Guard; Robert F. Oliver, both of Maitland, Fla.

[73] Assignee: Go Luggage Corporation, Maitland, Fla.

[22] Filed: Oct. 19, 1972

[21] Appl. No.: 298,866

Related U.S. Application Data

[60] Division of Ser. No. 33,644, May 1, 1970, Pat. No. 3,710,901, which is a continuation-in-part of Ser. No. 669,459, Sept. 21, 1967, abandoned.

[52] U.S. Cl.............. 24/208 A, 24/73 P, 85/5 R, 85/39, 85/81
[51] Int. Cl. .......................................... F16b 13/06
[58] Field of Search .............. 85/80, 81, 37, 38, 39, 85/4, 8.3, 5 R, 79, 1 S; 24/214, 213 R, 211 R, 208 A, 16 BF, 73 PP, 73 PF, 73 P

[56] References Cited
UNITED STATES PATENTS

| | | | |
|---|---|---|---|
| 531,363 | 12/1894 | Dinkelacker | 85/79 |
| 1,097,270 | 5/1914 | Thompson | 85/79 |
| 1,928,592 | 9/1933 | Johnson | 24/73 PP |
| 2,421,238 | 5/1947 | Borah | 24/73 P |
| 2,765,698 | 10/1956 | Devine | 85/5 R |
| 3,106,759 | 10/1963 | Kytta | 24/204 |
| 3,357,292 | 12/1967 | Falkenberg | 24/73 PF |
| 3,476,165 | 11/1969 | Vaughn | 85/80 |

FOREIGN PATENTS OR APPLICATIONS

| | | | |
|---|---|---|---|
| 1,059,761 | 2/1967 | Great Britain | 85/80 |
| 1,111,742 | 11/1955 | France | 24/213 R |

*Primary Examiner*—Marion Parsons, Jr.
*Attorney, Agent, or Firm*—Julian C. Renfro

[57] ABSTRACT

A two-piece hand-manipulated fastener comprising a first member with flexible prongs adapted to flex into an overlapping side by side relationship while being inserted through a workpiece aperture and then expanding to engage the reverse side of the workpiece. A second member in the form of a lock button with a pair of recesses is inserted into the workpiece aperture between the flexible prongs to lock the fastener in position.

8 Claims, 20 Drawing Figures

KNOCK DOWN LUGGAGE HAND-MANIPULATED FASTENER UTILIZING LOCK BUTTON

RELATIONSHIP TO PRIOR APPLICATION

This is a division of application Ser. No. 33,644, filed May 1, 1970, now U.S. Pat. No. 3,710,901 which in turn was a Continuation-in-Part of U.S. Pat. application Ser. No. 669,459, filed Sept. 21, 1967, and now abandoned entitled "Luggage."

BACKGROUND OF THIS INVENTION

1. Field of the Invention

This invention can be categorized with hand luggage arrangements of a type that can be stacked together.

2. Description of the Prior Art

The most pertinent prior art is believed to principally involve luggage units sold in more or less matched sets, with some such units being divisible into lesser components, but not to the same extent as is taught in accordance with present invention. Prior art hand luggage has been comparatively expensive inasmuch as it has always heretofore been dealt with as integral units, that are manufactured, shipped and sold as complete entities.

It is obvious that a great deal of time is required on the part of luggage manufacturers to assemble the top and bottom portions and the lesser components into finished luggage units, particularly when it is realized that a considerable amount of hand labor is involved in placing the hinges, latches and particularly the handle assembly in their operating positions. Not only does this hand labor drive up the cost of the luggage, but also a much larger expense is entailed in shipping the finished luggage than would be involved if the luggage components could be disassembled and nested together at the time of shipment.

With further regard to the manufacture of luggage in accordance with the prior art, it is to be realized that in assembling the various components into finished units, the manufacturer necessarily assumes the responsibility of all of the components being assembled in a properly fitting manner, which is to say that a late-discovered crack in a top or an ill fitting latch will necessitate that luggate unit being removed from the assembly line and reworked, which of course drives up manufacturing costs.

As to prior art luggage unit in the hands of the ultimate user, such unit is in storage a far greater percent of the time than it is in actual use, and inasmuch as such luggage cannot be disassembled and nested for storage purposes, a comparatively large area is required in the home of the owner merely for luggage storage. Also, rarely can the owner effect his own repairs or part replacement on ordinary prior art type luggage.

SUMMARY OF THIS INVENTION

In accordance with this invention we have provided a low cost and highly effective luggage configuration that can be assembled and disassembled at the will of the user, thus driving down manufacturing costs and therefore the sale price associated with the luggage. As a preferred example, the components of the luggage unit can be made of injection molded plastic, and can be sold as separate components in what may be regarded as a luggage kit. Inasmuch as these components are of a standard size, it is of course possible to interchange components between like luggage units, thereby making it possible to easily construct assembled luggage units of either matching or contrasting colors, which ever be desired.

When in disassembled relation, the tops and bottoms of an entire set of luggage units may be nested, with the latches, handles and other hardware components resting therein, thus requiring a minimum of storage space. Most significantly, if any one component of a luggage unit becomes lost or broken, only that one component need be replaced in order to restore that luggage unit to its original usefulness, thus entirely eliminating large repair bills, shipping costs, or premature discarding of the luggage.

Advantageously, a novel two-part fastener in accordance with our invention may be used for securing the parts of our luggage units together in operative relation, with the design of our interfitting luggage components being such that all shear loads are taken out by the parent material of the components, rather than by the fasteners.

To prevent an unauthorized person from disassembling our luggage units and thus having access to the contents, we have designed our novel two part fastener to be removable only by one having access to the interior of the luggage unit. This is made possible by the fact that we use a headed fastener having a pair of prongs that can be inserted through aligned apertures of two components to be joined together, which prongs, after passing through the apertures, tend to separate or diverge and thus lock in place. Although these prongs are thus self-locking, in a preferred embodiment of our invention, we use a lock button inserted from the interior or protected side of the luggage unit, that interfits or locks with the prongs of the fastening device. This lock button effectively prevents the prongs of the fastener component from being compressed into an overlapped relationship, as is necessary when the heated fastener is to be removed from the aligned apertures.

Other facets of our invention include what might be termed a rigid clothes carrier which is configured to be readily transported by an individual when assembled and filled with wearing apparel or other wares. As in the case of the other and more conventional types of luggage units, the several components constituting the rigid clothes carrier are held together by our novel two part fastener, thus making it possible to readily disassemble the clothes carrier. Additionally, the clothes carrier when disassembled may function as a top and bottom for receiving and storing a number of nested luggage units, thus making it convenient for all of the family's luggage to be compactly stored in one location.

It is therefore a principal object of our invention to provide a knock down luggage arrangement involving components that can be readily assembled by the user into frunctional luggage units.

It is another object of our invention to provide an inexpensive, standardized luggage arrangement in that all components are injection molded parts, made by automatic machines, with no assembly of the manufactured parts being necessary until purchased by the consumer.

It is still another object of this invention to provide luggage units that when disassembled can be nested to minimize shipping and storage costs, with it being easily possible for lost or broken components to be replaced by the user.

It is yet another object of our invention to provide optimally sized luggage units for known volumes, such as of the storage areas of particular automobiles, thereby making it possible to place a maximum amount of luggage in such facilities.

It is yet still another object of our invention to make known a two-part fastener for removably securing two components together by providing a pronged member adapted to extend through aligned apertures in the components, which member is utilized in concert with a lock button preventing removal of the pronged member except by one having access to a certain side of such components.

Other facets of our invention involve the fact that fewer parts are involved in our luggage units, thus also driving down cost, with our configuration making not only feasible but attractive the use of a one-piece molded hinge held in operative relation with the top and bottom luggage components by the use of our novel two-part fastener.

These and other objects, features and advantages of our invention will be more apparent from a study of the appended drawings in which.

DETAILED DESCRIPTION OF LUGGAGE UNITS

Figure 1:
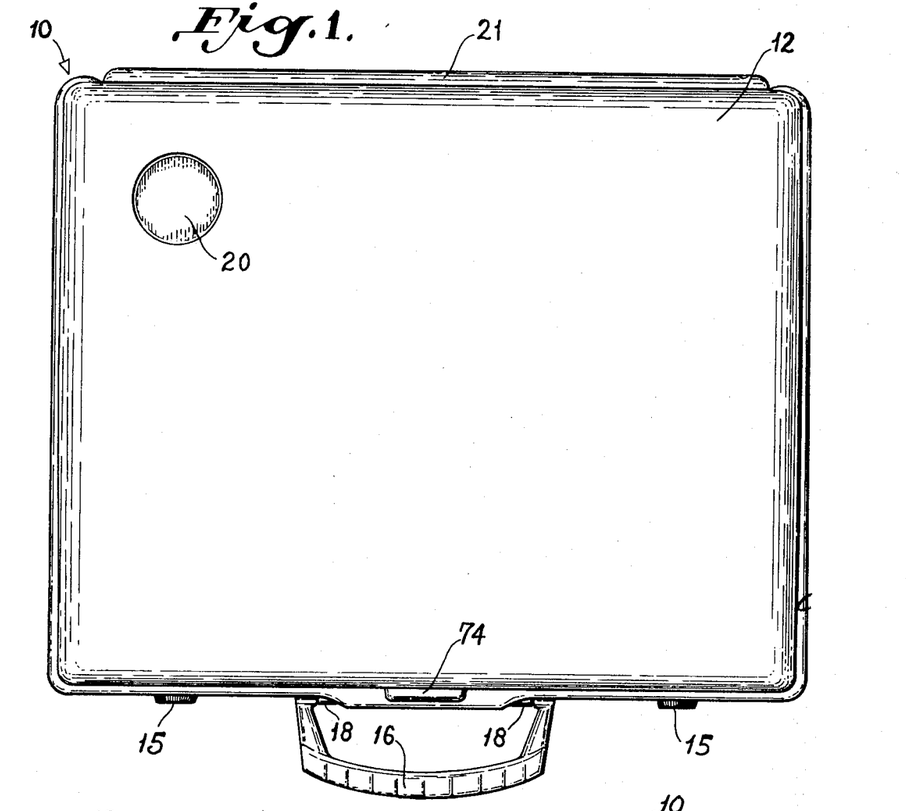
FIG. 1 is a top plan view of a typical luggage unit embodying our invention.
Figure 2:
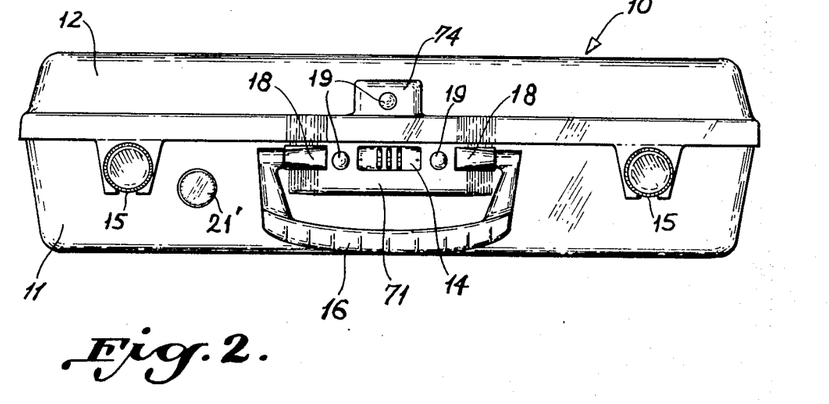
FIG. 2 is an end view of the unit of FIG. 1 illustrating the handle and latch units, and the optical lock.
Figures 3, 4, 5:
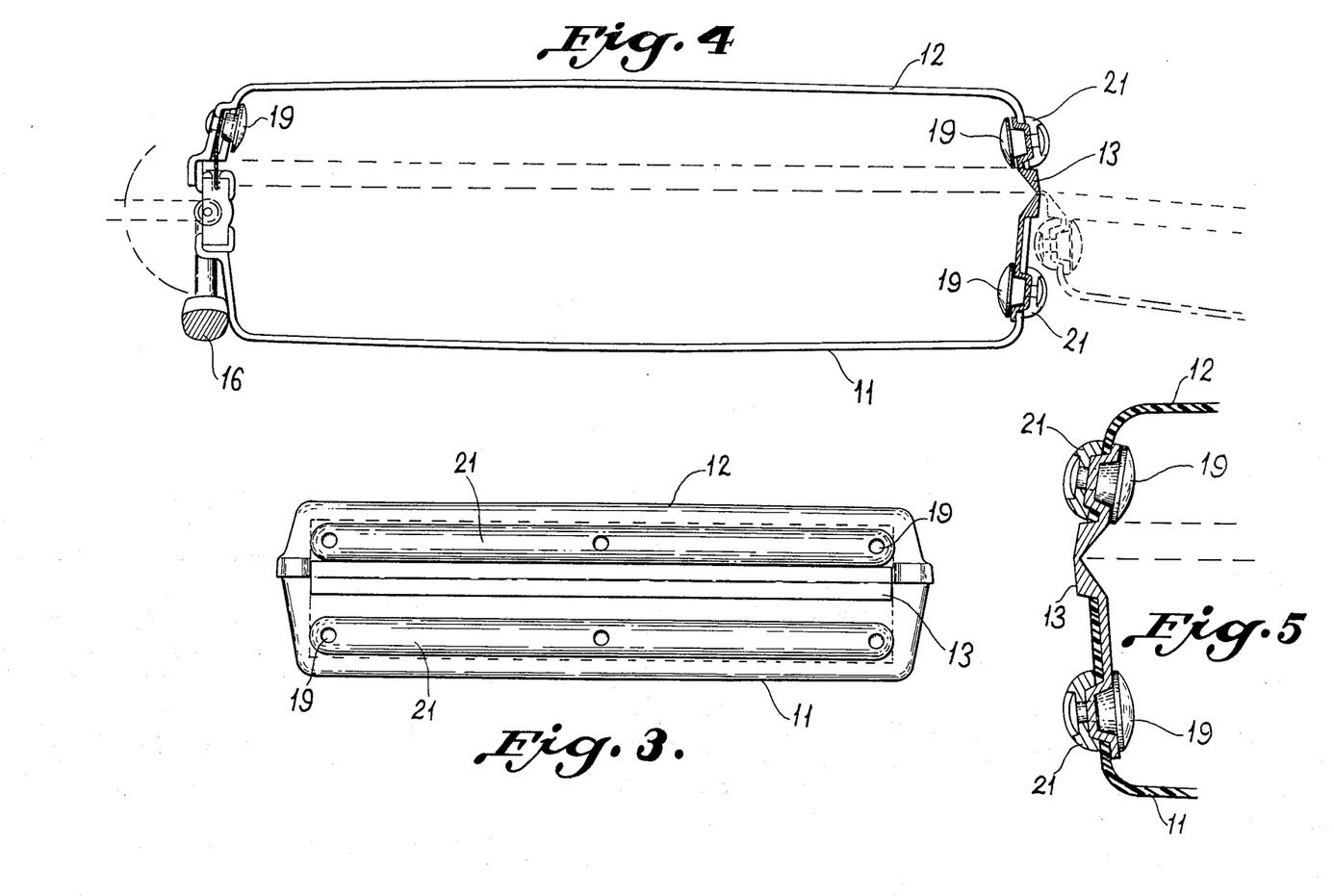
FIG. 3 is an end view revealing the appearance of the hinged or bottom portion of a luggage unit, and the laterally extending legs that may be used adjacent the hinge.
FIG. 4 is a cross sectional view taken along the lines 4—4 in FIG. 2, to reveal internal detail.
FIG. 5 is a fragmentary view to a larger scale revealing hinge details.

Referring to FIGS. 1 through 5, it will be noted that we have there illustrated a typical knock down luggage unit in accordance with the present invention, involving the use of a bottom or body member 11, a top or closure member 12, and in FIGS. 3 through 5, the use of a strip hinge 13 interconnecting the body member and the top. Our novel two part fastener 19 will be discussed in greater detail hereinafter, and it should now suffice to say that FIGS. 4 and 5 reveal the manner in which the luggage components are held in assembled relation by the use of a number of such fasteners.

The bottom 11 and the top 12 can be constructed of high impact polyethylenes, polypropylenes, or other synthetic material capable of being formed by high production molding techniques, such as blow molding, vacuum forming, injection molding, and the like. The preferable material is an ABS plastic marketed by Marbon Chemical Co. under the tradename "Cycolac." Although it is possible to choose a material suitable for both a top and bottom and the hinge component, so that the hinge could be made integrally with the top or the bottom, we have found the best hinge material to be polypropylene, and this may dictate the hinge being made separate from either the top or the bottom, and secured to these members when the luggage is to be assembled. Although our two-part fastener could be made of various suitable plastic materials, we have found the best material to be nylon.

It will be noted that the corners of the top and bottom luggage components members are preferably rounded, with these members having somewhat angled or tapered side portions for ease in moldability and to permit all the bottoms and all of the tops of a set of luggage units to be nested for packaging, storage or shipping.

Figures 15, 15A:
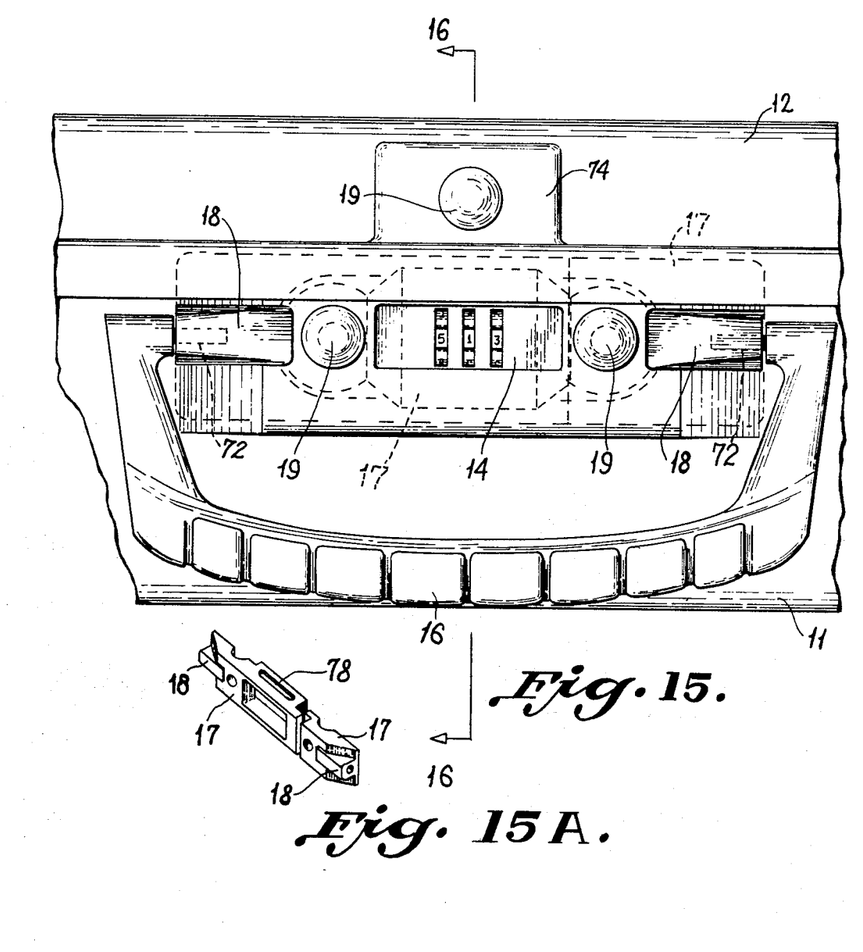
FIG. 15 is a view to a larger scale of the handle portion of our novel luggage unit, revealing how the handle, optional lock and latching portions are held in operative position by the use of a pair of our novel two part fasteners.

As previously mentioned, all of the components of a luggage unit can be disassembled, not only for reasons of storage but also because of the ease of replacement. The handle member 16 is attached to the bottom member 11 by means of a two part handle receiving assembly 17, that is disposed essentially on the interior of the bottom member, with only the handle-receiving bosses 18 of members 17 extending through apertures in the front of the member 11, so as to be directly visible in FIG. 2. Preferably the handle-receiving assembly 17 is made in unequally sized portions, as indicated in FIGS. 15 and 15A, with one portion adapted to contain a lock 14, and with each of these portions adapted to reside in a slight protuberance or bent out portion 71 in the front of the lower unit 11; see FIG. 16. FIG. 15 reveals the apertures in protuberance 71 through which the handle bosses 18 extend, and the lock visible.

We have made the handle-receiving assembly 17 in two portions to facilitate the insertion of the inwardly pointing portions 72 of the handle 16 into matching recesses in the handle-receiving assembly, for although the handle could perhaps be "sprung" to an extent that the inwardly extending portions could be inserted into the recesses in the bosses 18 of the handle receiving assembly, it follows that a heavy loading of the luggage could likewise cause the handle to be "sprung," which would of course be highly undesirable. Accordingly, we preferably construct the handle 16 to be sufficiently rigid that such a springing is not possible, with of course the separation of the handle-receiving assembly 17 making it easily possible to insert the inwardly extending portions of the handle into the members 17. As previously indicated, a pair of two-part fasteners 19 in accordance with this invention are utilized after the handle 16 has been inserted, for holding the two-piece handle-receiving assembly 17 in the protuberance in the front of the lower member, in the manner indicated in FIG. 15.

Figure 16:
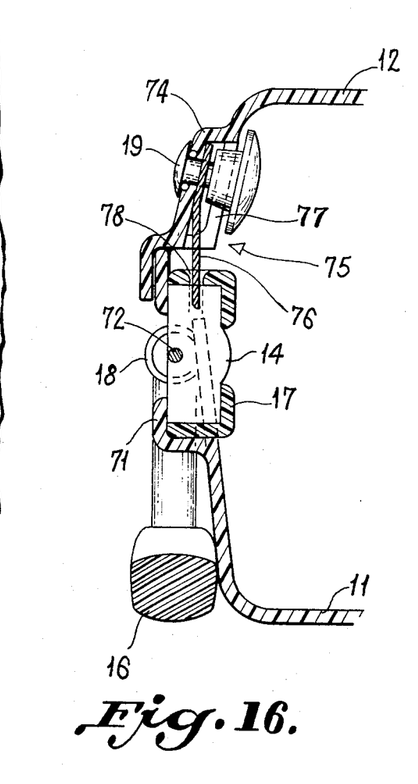
FIG. 16 is a cross-sectional view revealing the manner in which the lock strike assembly and the lock interfit, and further revealing the manner in which the strike components are held in place by our novel two part fasteners.

FIG. 16 not only reveals some of the details of the handle-receiving assembly, but also reveals a protuberance 74 in the cover member 12 in which the lock strike assembly 75 is inserted in the top 12 of the luggage unit. The strike assembly includes a strike 76 and a strike fitting 77, held in place by a novel two-part fastener 19. A slot 78 is provided in the plastic handle receiving assembly 17 to permit the lower part of the strike 76 to pass through and engage the latching portion of the lock 14.

As is obvious, should the lock become broken or malfunction, or should the handle become lost during storage, it is but an easy matter to replace these with readily available replacement components, with replacement being now more difficult than separating the two part fastener or fasteners involved, inserting the replacement, and then reassembling the two-part fastener, accomplished of course without the use of tools of any kind.

The latches 15 shown in FIG. 2 are preferably of a rotary type, mounted in suitable flaps or the like, integral with the top member. On the rear of each latch member is a cam type or bayonet type fastener that interfits with a respective hole (not shown) in the front of the lower member 11.

It should be noted from the cross-sectional views, such as FIG. 5, that we have designed our luggage components to remove as much shear force as possible from the novel two-part fasteners 19. This is to say, the hinge member 13 is designed to have bosses or enlarged portions at locations where the fasteners are to be inserted, which bosses are located and spaced to coincide with apertures in the bottom and top members 11 and 12 utilized when the hinge is to be installed; see FIG. 3. Thus, by prearrangement, the bosses in the hinge member 13 physically extend into certain apertures in the top and bottom members opposite the handle portion, and therefore are available to absorb the separating force involved if the luggage is packed very tightly, or alternatively, to absorb the compressive force involved if weight is placed to cause the top and bottom to move closer together. It should also be noted that the legs 21 shown in cross-section in FIG. 5 not only serve to provide a steady base upon which the luggage can stand upright, but also these leg members are wide enough in the top and bottom direction in FIG. 5 to cause the force from the head portion of the fasteners to act through the leg and against the outer surface of the member 11 or member 12 as the case may be. One should endeavor to carry forth this basic boss and aperture concept at each location in the luggage where our two-part fastener 19 is to be used.

It will be readily appareciated that the body 11, the closure 12, and the hinge means 13 can be fabricated in great quantity, while keeping in mind the necessity of maintaining a preestablished hole spacing so that replacement parts will always interfit. Since the fastening components can be quickly installed to provide the hinge connection 13 between the body 11 and closure 12, as well as the other facets of the luggage, the individual parts are thus capable of easy and simple interconnection to provide what might be termed the completed luggage unit. This arrangement of course means that any needed replacement component may be readily purchased, which is a distinct advantage over prior art type luggage which, in the event of damage to one or more of the elements constituting the unit, requires either a purchase of an entirely new unit or at best an expensive repair job.

Moreover, in view of the fact that each luggage unit can be dismantled, it will be readily appreciated that when the luggage is not in use, it is possible to nest tops, bottoms and components, thus greatly reducing the space required for storage.

It will be noted that each unit carries, preferably on the outer surface of the cover 12, identifying indicia 20 which may be located in an inward boss provided on such surface. In addition, the end of the body 11 may be provided with a boss 21' having associated therewith a number or other suitable indicating legend providing useful information, such as identifying a particular automobile with which the luggage set may be used.

If desired, a pictorial chart may be incorporated for each size luggage set, illustrating in detail the loading sequence for the individual units. By virtue of the indicia 20 and the indicia 21, and if desired, complementary recesses in the bottoms and protuberances in the tops of the luggage units, it is readily apparent that it is well-nigh impossible to stack or position the units constituting a given luggage set improperly, Hence, there is no necessity to experiment or to distort our luggage in fitting it into a designated volume or location.

It is further believed readily apparent from the description that the individual components constituting the luggage unit, such as the body, closures, and components can be stocked in bins or on shelves in an orderly manner in retail outlets. This means that a person desiring an individual luggage unit of a certain size or a particular component of such unit could purchase either the entire unit or the desired unit from a catalogue or parts list and thereafter assemble the unit at his leisure. Due to the simplicity, yet the effectiveness of the two-part fastener 19, the unit may be assembled even with inexperienced personnel within two minutes.

It is a further aspect of the invention, but not illustrated herein, that inserts may be employed with a luggage unit for converting such unit into one having a particular or specialized use. For example, a plastic insert for holding soft drinks or other potables could be snapped into position within the unit 10 by use of one or more connecting means 19 and a polypropylene strip generally of the type illustrated at 13. To accomplish such ends, the insert, regardless of its particular nature, would have apertured bosses so located as to match with apertures provided in the body 11 and/or closure 12.

Figure 13:
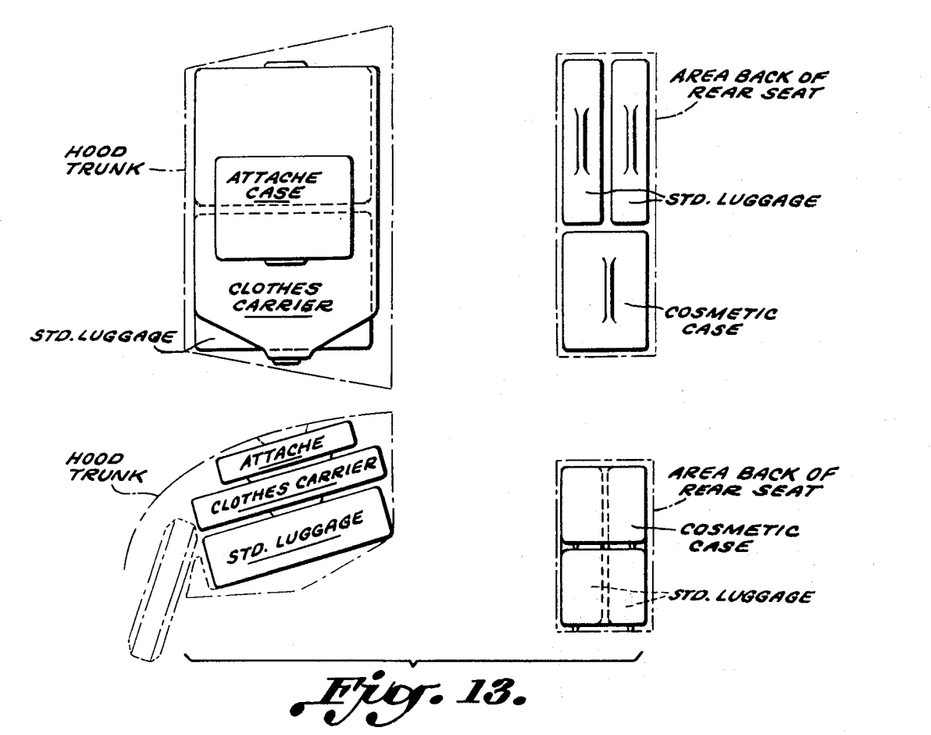
FIG. 13 is a diagramatic view illustrating the manner in which a plurality of luggage units may be selectively positioned in the storage facilities of a compact motor vehicle, in this instance a Volkswagen.
Figure 14:
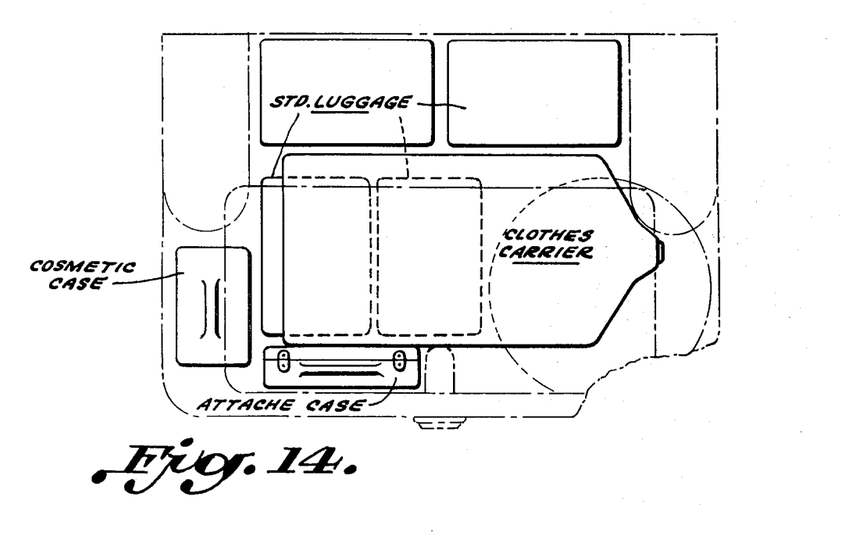
FIG. 14 is a view generally similar to FIG. 13 showing the selected optimum luggage arrangement in the storage facility of another type of motor vehicle, in this instance a Mustang.

In order to demonstrate the manner in which luggage embodying the present invention can be readily utilized in confined or restricted storage facilities, such as motor vehicles, attention is directed to FIGS. 13 and 14. These particular figures illustrate the mode of installation of our luggage in a Volkswagen and a Mustang respectively. Needless to say, upon proper determination of the optimum storage "layout" of other vehicles, the same concept may be used with equally good results.

A typical set of luggage in accordance with our invention may include eight luggage units, for example, which is the number involved in conjunction with a Volkswagen. However, for other vehicles, the optimum number of pieces of luggage may be larger or smaller.

The total number of pieces of luggage from which the purchaser may choose may for example involve fifteen differently sized items, and by way of further example, we could make the top member 12 in several different depths, each interfitting with the size bottom member 11 that he has selected. He will of course buy the hinge member appropriate for these top and bottom members insofar as length of hinge is concerned, and in all instances, all parties to the transaction will make certain that the spacing of the holes and bosses in the hinge will coincide with the spacing of the holes in the upper and lower members 12 and 11 adjacent the portion contacted by the hinge so that ready fits will always be assured.

Generally, we have found that available space can be used more effectively if a larger number of smaller luggage units are utilized rather than endeavoring to use the larger size units.

DETAILED DESCRIPTION OF CLOTHES CARRIER

Figure 6:
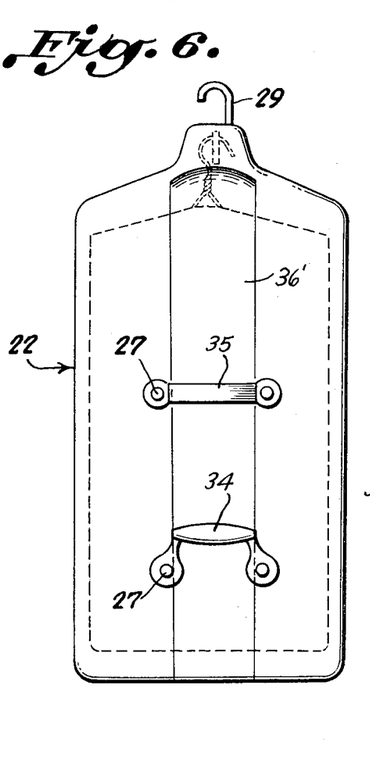
FIG. 6 is an elevational view of the rigid clothes carrier facet of our invention, showing the novel handle and arm loop arrangement for carrying.
Figure 7:
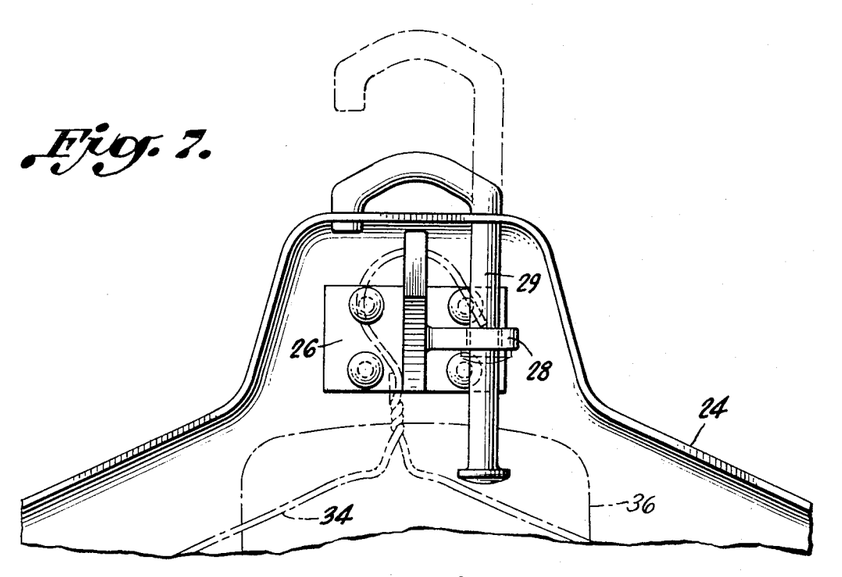
FIG. 7 is a fragmentary view partly in elevation and partly in cross-section to a larger scale to reveal significant details of the upper portion of the carrier of FIG. 6.
Figure 8:
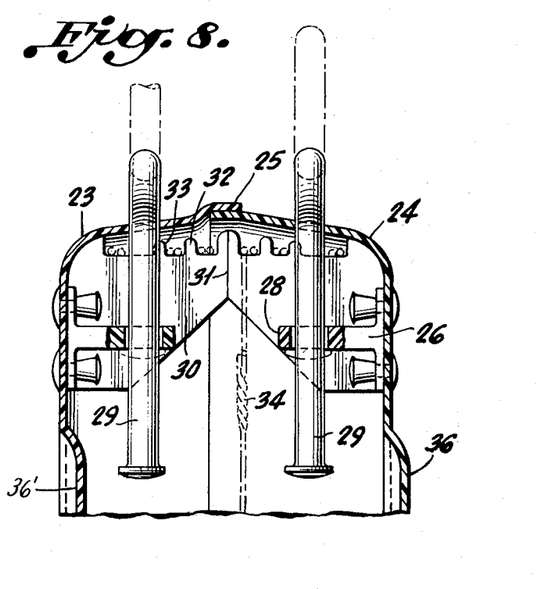
FIG. 8 is an end view partly in elevation and partly in section of the arrangement illustrated in FIG. 7.

As mentioned, our novel luggage concepts include a rigid clothes carrier which is perhaps best illustrated in FIGS. 6–8 and such clothes carrier is indicated generally at 22. The clothes carrier is constituted by two mating portions 23 and 24 substantially U-shaped in cross-section and adapted to interlock along their free or marginal edges frictionally as denoted at 25 in FIG. 8. Removable hinge means and associated fastening components extend along one long side of the carrier and latching and locking components and removable fastening components therefor are arranged along the opposite long side. Since these components are the same as used with all other luggage uits, they are not illustrated in connection with the clothes carrier. The dimensions of the carrier are such as to accommodate men's suits, ladies' dresses, etc.

However, our novel clothes carrier is capable of relatively simple conversion into a unit for housing items other than those of wearing apparel. For example, a holder can be detachably connected within the interior of the carrier for holding rifles, pistols, golf clubs, a portable display unit for salesmen, etc. Since the carrier is fabricated from rigid-like material and is capable of being readily separated into two components, each component thereof may be employed for various results. Furthermore, due to the rigid nature of such carrier, any articles of wearing apparel which are housed therein will not become folded, wrinkled, etc., or dislocated, which, of course, is of primary importance for travelers. Since the components 23 and 24 are separate entities, it is possible to use one unit for male attire and the other for female attire.

As shown in FIG. 7, a molded bracket 26 is attached to the bottom wall of each of the components 23 and 24 by means of connectors 27 which are identical in mechanical detail to the two-part fastener 19, but which for example may be larger. Each bracket 26 is provided with a laterally extending arm 28 having an aperture therein and in which aperture is mounted a hooklike component 29 capable of sliding movement relative thereto. The bracket 26 further includes a vertical portion 30 and each free edge of the portion 30 defines a planar face 31 and when the components 23 and 24 are in the closed position as shown in FIG. 8, the faces 31 abut. The upper horizontal edge of the bracket 26 is provided with spaced apart projections 32 and depressions 33. The relationship, or that is to say, the dimensions of the projections and depressions may vary and the arrangement is such that the hooks of clothes hangers 34 may be hooked over the bottom wall or trough of the depressions 33. As is readily apparent from FIG. 8, the arrangement is such that a plurality of hangers can be positioned between two protuberances but needless to say, this may be changed to suit the particular circumstances involved.

The bottom surface of one of the components and in the drawings the component 23 is provided with a handle 34', as illustrated in FIG. 6, and the handle is attached to the bottom surface by the connecting means 27. Spaced above the handle 34' is an arm loop 35 also secured by the connecting means 27. The handle 34' is located in such a position as to be confortably grasped by the hand, and when grasped, be in a well balanced position with respect to the arm strap or loop 35, permitting the individual to carry the carrier 22 with his arm in a straight down position. Due to the rigid nature of the carrier, it may be rested, when desired, on a suitable supporting surface, such as a floor or pavement and thereafter raised with a minimum of effort Both parts 23 and 24 are provided with a rib 36 for stiffness and aesthetic purposes.

The carrier 22 performs several important functions in addition to those above mentioned. In the first place, it is a portable container for clothes carried and mounted on hangers and second, the two components constituting the completed carrier, when separated are usable as elements for enclosing the nested bodies and closures of the complete luggage set.

It is also entirely feasible within the scope of the invention to provide the carrier 22 with inserts of desired character which may be detachably affixed thereto by our novel two-part connecting means, such as illustrated at 19 in FIG. 3. The variations of the basic structure are innumerable and such structure could be modified to carry clothing articles, such as shirts, shoes, underwear, etc., by suitably designed dividers or the like.

A retractable hook arrangement 29 for each component enables the individual components to be readily suspended from a suitable support, and either or both hooks can be used when the components 23 and 24 are in assembled relation. It will further be appreciated that the pronged fastener and the locking button utilizable therewith is capable of use in many different environments which require a connecting means which does not neccesitate the use of either conventional tools or specially designed tools for effecting the connection. This assemblage is a tamper-proof unit and can be readily assembled and disassembled by authorized personnel with a minimum of effort and in a minimum of time.

DETAILED DESCRIPTION OF TWO-PART FASTENER

Referring now to FIGS. 9 through 12, our novel connecting means 19 is seen to include two basic ompo- nents, a headed member 37 equipped with a pair of somewhat flexible prongs 40 disposed substantially perpendicularly to the head portion 38 of the member 37, and a lock button 37A cooperable with the headed member for installation on the prongs to prevent an unauthorized removal or separation of the fastener. The interfitting and the separation of these two fastener components is such as to be accomplished entirely without the use of tools of any kind. The headed or pronged member 37 is preferably a molded nylon unit whose head 38 can be of any desired configuration, although a rounded configuration along the lines indicated in the drawing is preferred.

Figure 9:
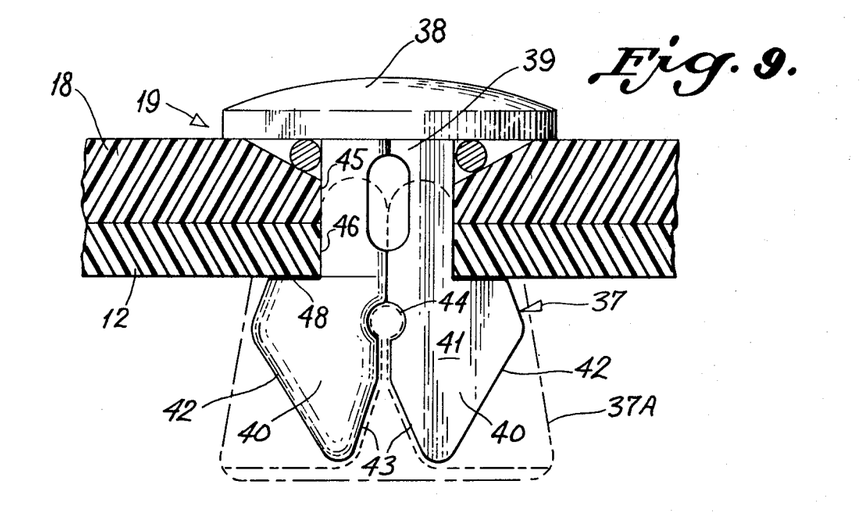
FIG. 9 is a view to a larger scale of the novel two-part fastener in accordance with our invention, this view being partly in elevation and partly in cross-section.
Figure 10:
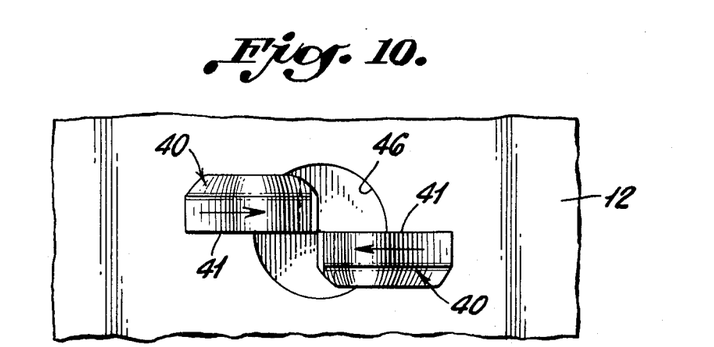
FIG. 10 is a view of the prong end of the headed fastener, revealing how the prongs are offset, and how they separate subsequent to insertion of the fastener through the aligned apertures revealed in FIG. 9, thus securing the fastener in place.

Extending from the lower side of the head are prongs that are basically disposed substantially perpendicularly to the head portion of the member, but normally divergent and mounted in a slightly offset manner as best observed in FIG. 10. After the prongs have been inserted through a pair of aligned apertures such as 45 and 46 in FIGS. 9 and 11, the prongs then normally tend to move apart to the divergent position so as to bring about a locking of the components 12 and 18 together. It will be noted that flat shoulders 48 are provided on the part of the prongs that move beyond the confines of the aperture farthest from the head, and seat on member 12 to form a type of locking action. The use of an O-ring is optional.

Figures 17A, 17B:
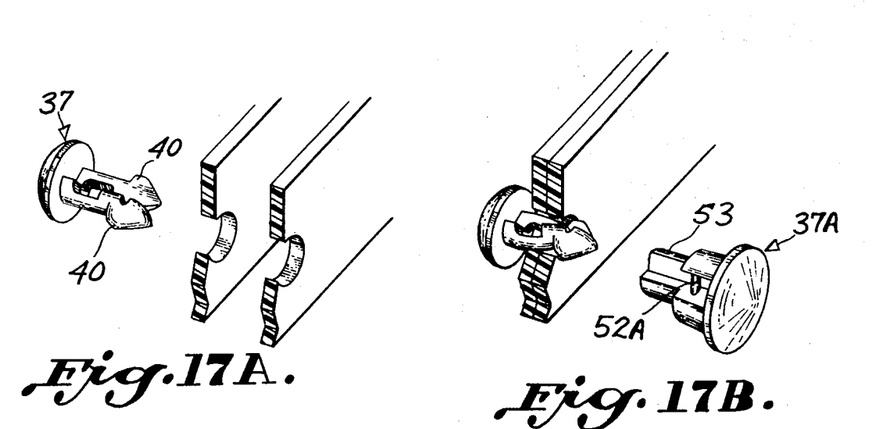
FIGS. 17a, 17b and 17c reveal how the pronged member is brought toward a pair of components whose apertures are in aligned relation; how the prongs are moved together into an overlapping relationship while passing through the apertures; and how the lock button is inserted onto the prongs after they have spread apart subsequent to passing through both apertures, with the lock button keeping the prongs in divergent positions, thus preventing unauthorized removal of the pronged member.
Figure 17C:
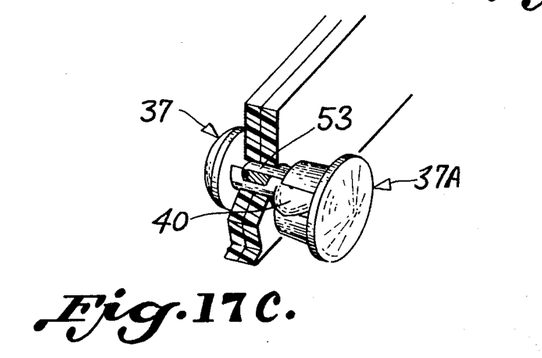

As will be noted from FIGS. 9 and 10, the prongs 40 may have flat facing surfaces 41 that may be brought substantially together in an overlapping relationship as shown in FIG. 17b when the prongs are to be passed through a pair of aligned apertures. The prongs normally diverge into the position shown in FIGS. 9 through 11, but because of a degree of flexibility, the prongs can squeeze together at such time as they are to be passed through the apertures. So as to make the prongs essentially self-starting insofar as insertion into apertures is concerned, we dispose the tips of the prongs less far apart than the diameter of the aperture to be entered, and we taper the outermost portions of the prongs as shown at 42. Thus, the portions of the prongs farthest from the head 38 form a configuration smaller than the diameter of the apertures through which the prongs are to be passed. When brought adjacent an perture, the tapered outer portions 42 contact the sidewalls of the orifice, and these contours cause the prongs to move together as pressure is applied to the head 38 to force the fastener member in the aligned apertures. Thus, after the insertion procedure has started, the prongs continue to move further into the overlap position as may be necessary for them to pass into and through the apertures. Thereafter, the prongs return to their divergent positions so as to secure the two components together.

Further, it will be noted from FIG. 9 that we bevel the inner sides of the prongs as shown in 43 in FIG. 9, thus to provide a V-shaped throat which merges with a substantially circular aperture 44 defined by complementary half-circular holes formed in the resepective prongs. The purpose of the aperture has to do with the securing of the lock button in position, as will be explained shortly.

While the headed fastener member is quite staisfactory for securing two components together and cannot be removed from the inserted position by grasping the head portion 38, it is possible if sufficient force is exerted on the head by the claw of a hammer for example, for the prongs to be moved toward the overlapping relationship and thus distort sufficiently to release the fastener. It was to prevent such a possibility that the lock button 37A was provided.

Figure 12:
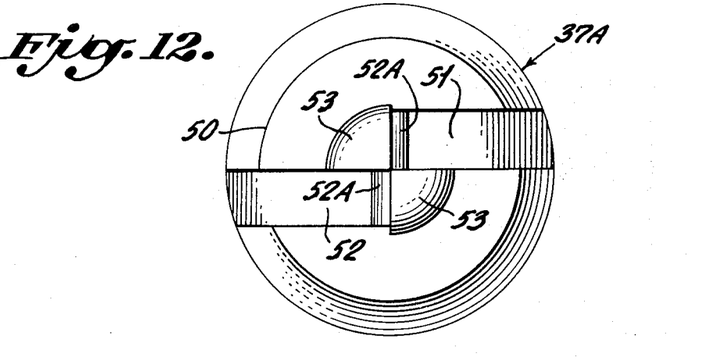
FIG. 12 is a view of the nib end of the lock button of FIG. 11.

The lock button 37A is also preferably a one piece molded unit of nylon that includes a body portion 50 having a pair of slots 51 and 52 that are offset to the same degree as the prongs of the headed member; note FIG. 12. Located in each of these slots is a semi- circular member 52A that is designed to coincide with the aperture 44 of the headed member when the two fastener members have been interfitted. Thus, when the lock button is pushed onto the prongs extending from the headed member, the prongs enter the slots 51 and 52, and the semi-circular member 52A moves upwardly along the bevel portions 43 and snaps into place in the aperture 44. Semi-circular member 52A is slightly larger in diameter than the throat dimension leading into the aperture 44. Bending must occur in the prongs adjacent to aperture 44 to allow 52A to pass through the throat and seat into aperture 44 to secure the lock button 37A to fastener 37.

At the time the member 52A enters the aperture 44 at the end of the V-shaped throat, the nibs 53 enter the aperture 46 and 45 in the components being secured together, and tend to fill these apertures. Thus, the nibs serve to prevent the shank portions 39 of the pronged fastener from shifting, and also prevent any sliding movements of the components 12 and 18 with respect to each other.

By virtue of the co-action of the button 37A with the fastener 37 there is provided an assemblage which when properly installed, is entirely tamper-proof and cannot be removed from the secured items exteriorly. However, our two-part fastener is capable of being easily removed manually from the inside of the unit by first removing the locking button 37A so that the prongs of the fastener 37 can be squeezed together and pushed out. It will further be appreciated that both the fastener 37 and the lock button 37A can be of any desired color so as to blend harmoniously with the color of the particular units with which such components are utilized.

As will now be apparent, our novel two-part fastener represents an important adjunct to our knock down luggage invention in that it makes it possible to rapidly and releasably fasten the components of the luggage together, and to be tamperproof when the luggage is in the closed and locked position.

Although we are not to be limited to any certain material, we prefer to make the headed fastener member 37 of nylon, although in some instances it could be made of other synthetic materials such as polyethylene, polypropylene or a rubber type material. More latitude is involved in the lock button 37A, and although it also could be made of nylon, it may also be made of other synthetic materials including a wide range of plastics, or even of wood or metal.

Although we are not to be limited to the following dimensions, the components 12 and 18 may have apertures 45 and 46 one-fourth inch in diameter, and may for example have a total thickness of ¼ inch. For such thickness, we may prefer to have the shank portions 39 of the member 37 approximately 1/32 inch longer, or in other words, the distance between the underside of the head 38 and the shoulders 48 have a distance of 9/32 inch. In this instance, the head 38 may have a diameter of 9/16 inch, and the shanks 39 of a dimension approximately ¼ inch in order to fill up the ¼ inch hole in the components being joined. The shoulders 48 can each have a dimension of say 3/32 inches as viewed in FIG. 9, and the aperture 44 formed by the semicircles have a diameter of 0.093 inches, with its center being approximately 0.093 inches below the shoulders 48.

As to the prongs 40, they should have a side to side width as viewed in FIG. 9 of approximately that of the diameter of the head of the pronged fastener member, with such width being desirable in order to give sufficient material to squeeze with the fingers when the member 37 is to be removed from the apertures.

In order to have the fastener member self-starting, the lowermost tips of the prongs 40 should be arranged to fit easily without squeezing into the apertures, the angle of the surfaces 42 should preferably be at a 30° angle to the longitudinal centerline of the fastener, and the surface 43 may each be at a 20° angle to such centerline, with the lowermost tips of the prongs in this instance being rounded with a 0.039 inch radius.

Figure 11:
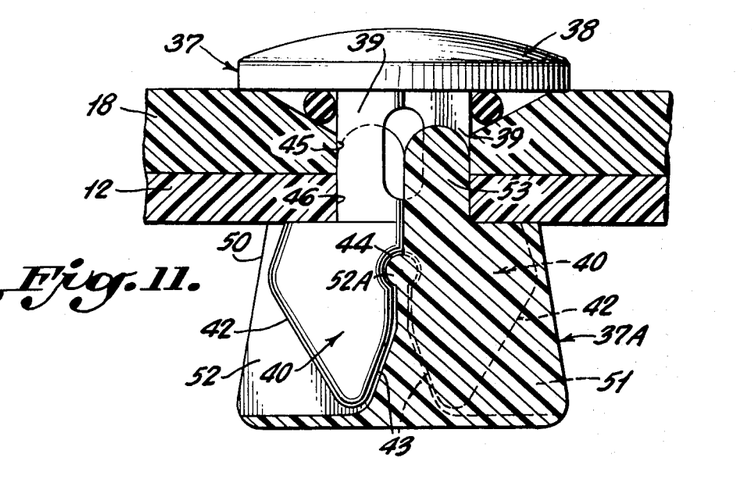
FIG. 11 is a view partly in elevation and partly in cross-section revealing how our novel lock button interfits with the prongs of the fastener, thus preventing the prongs moving to an overlapped position requisite to removal of the fastener.

Although the outer surfaces of the prongs remote from the substantially flat surfaces 41 could also be flat if the prongs are comparatively thin, we have found that we have a much more satisfactory fastener member 37 if we make the parts of the prongs nearest the longitudinal centerline as viewed in FIGS. 9 and 11 of virtually the full thickness of the aperture to be entered, or in the instance of a ¼ inch aperture, the prongs could each have a maximum dimension in the up and down direction in FIG. 10 of ⅛ inch, or else slightly less, as illustrated in FIG. 10. Such an arrangement of course requires a radius or chamfer to be put on the outer, or left-right extremes of the prongs as viewed in FIG. 10, so that they can easily pass into the apertures when they have moved into a side-by-side or overlapped relation. A ⅛ inch radius for these outer prong edges is preferred for use in ¼ inch apertures.

We claim:

1. A hand-manipulated fastener for securing together a pair of components equipped with apertures that can be brought into alignment, said fastener comprising a headed member equipped with a pair of somewhat flexible prongs disposed substantially perpendicularly to the head portion of said member, said prongs being normally divergent and mounted in a slightly offset manner so that they can be moved from the divergent positions into an overlapping relationship at such time as they are to be passed through an aperture, said prongs, upon being brought adjacent a pair of apertures, tending to move into the overlapping relationship in order to pass through the apertures, and thereafter to again diverge and lock the two components together, said fastener further including a removable lock button, said lock button having a pair of recesses disposed to receive at least a portion of said prongs, securing means normally retaining said lock button in locking relationship with said prongs, said lock button being removable, however, for engagement with said prongs without the use of tools, said lock button, when in interlocking relation with said prongs, preventing the prongs from moving into the overlapping relationship and thus preventing the unauthorized removal of the headed member from the components.

2. A hand-manipulated fastener assemblage of synthetic material adapted to interconnect members having apertures in registration, comprising a pronged fastener equipped with a head, and relatively flexible prongs extending from the head in essentially parallel relation to each other, and being offset with respect to each other, said prongs normally being divergent, but being capable of moving because of said offset into a substantially side-by-side relation, the portions of said prongs remote from said head being rounded and contoured so that when brought adjacent an aperture and pressure applied to the head, the prongs can enter the apertures, with the prongs in so doing moving into side-by-side relation, and after the prongs have passed through the apertures, returning to their normal divergent parallel relation so as to secure the members together, said fastener further including a removable lock button, said lock button being provided to fasten to the part of said prongs extending through the members, thus preventing the prongs from being moved back into the side-by-side relation necessary for removal from the apertures.

3. A hand-manipulated fastener assemblage of synthetic material adapted to interconnect members having apertures in registry, comprising a pronged fastener equipped with a head, and relatively flexible prongs extending from the head in essentially parallel relation to each other, and being offset with respect to each other, said prongs normally being divergent but being capable of moving because of said offset into a substantially side-by-side relation, the portions of said prongs remote from said head being rounded and contoured so that when brought adjacent an aperture and pressure applied to the head, the prongs can enter the apertures, with the prongs in so doing moving into side-by-side relation, and after the prongs have passed through the apertures, returning to their normal divergent parallel relation so as to secure the members together, said fastener further including a removable lock button, said lock button comprising a body having a pair of nibs extending therefrom and disposed complementary to the configuration of said prongs extending through the members, so that when the button is forced against the prongs, said nibs also enter the apertures in the members, not only to hold said prongs in fixed position, thereby locking positively the fastener in place, but also to provide considerable shear strength to the fastener.

4. The hand-manipulated fastener assemblage as defined in claim 3 in which securing means are provided for normally preventing displacement of said lock button away from the locking position with respect to said prongs, said lock button being on occasion removable, however, without the use of tools.

5. A hand-manipulated fastener for securing together a pair of components equipped with apertures that can be brought into alignment, said fastener comprising a headed member equipped with a pair of somewhat flexible prongs disposed substantially perpendicularly to the head portion of said member, said prongs being normally divergent and mounted in a slightly offset manner so that they can be moved from the divergent positions into an overlapping relationship at such time as they are to be passed through an aperture, said prongs, upon being brought adjacent a pair of apertures, tending to move into the overlapping relationship in order to pass through the apertures, and thereafter to again diverge and lock the two components together, a corresponding edge of each of said prongs having a notch located therein, with said notches being in substantial alignment when said prongs are in their normally divergent relationship, said fastener further including a removable lock button, said lock button having a pair of nibs extending therefrom, the placement of which are essentially complementary to the placement of said prongs, said lock button also having a pair of slots for receiving said prongs when said lock button has been pressed into position on said prongs so as to cause an interdigitation of said prongs and nibs, and a protuberance on at least one of said nibs for engaging the notch in the corresponding prong, thus to removably secure said lock button in the position locking the prongs.

6. The fastener as defined in claim 5 in which said nibs extend into the aligned apertures when said lock button has been pressed into the locking position, thus to greatly increase the shear strength of the fastener.

7. A hand-manipulated fastener of synthetic material adapted to form a structural interconnection between members having apertures in registration, said fastener comprising a pronged fastener member equipped with a head, and relatively flexible prongs extending from the head in essentially parallel relation to each other and being somewhat offset with respect to each other, said prongs normally being divergent but because of such offset, being capable of being moved into a substantially side-by-side relation, the portions of said prongs remote from said head being rounded and contoured so as to define a V-shaped throat between near edges of said prongs when said prongs are in their normally divergent relationship, a notch being located in each of said prongs, with said notches being in substantial alignment with each other and adjacent said throat when said prongs are in their divergent relation, the contouring of outer portions of said prongs being such that when brought adjacent an aperture and pressure is applied to the head, the prongs can enter the aperture, with the prongs in so doing moving temporarily into side-by-side relation, and after the prongs have passed through the apertures, returning to their normally divergent, essentially parallel relation so as to secure the member together, said fastener further including a lock button that can be installed as well as removed without the use of tools, said lock button having a pair of nibs extending therefrom, the placement of which are essentially complementary to the placement of said prongs, said lock button also having a pair of slots for receiving said prongs when said lock button has been pressed into position on said prongs so as to cause an interdigitation of said prongs and nibs, and a protuberance on at least one of said nibs for engaging the notch in the corresponding prong, thus to removably secure said lock button in the position locking the prongs.

8. The hand-manipulated fastener as defined in claim 7 in which said nibs are of sufficient length as to extend through both apertures when such are in registration. said nips and prongs on such occasions substantially completely filling the apertures, and thus greatly increasing the shear strength of the fastener.

* * * * *